April 22, 1958     L. R. BUCKENDALE     2,831,731
NON-DRIVING AXLE

Filed Sept. 2, 1953     2 Sheets-Sheet 1

INVENTOR
LAWRENCE R. BUCKENDALE, DECEASED
BY GERTRUDE H. PETSCH, EXECUTRIX

BY Strauch, Nolan & Diggins
ATTORNEYS

April 22, 1958 L. R. BUCKENDALE 2,831,731
NON-DRIVING AXLE
Filed Sept. 2, 1953 2 Sheets-Sheet 2
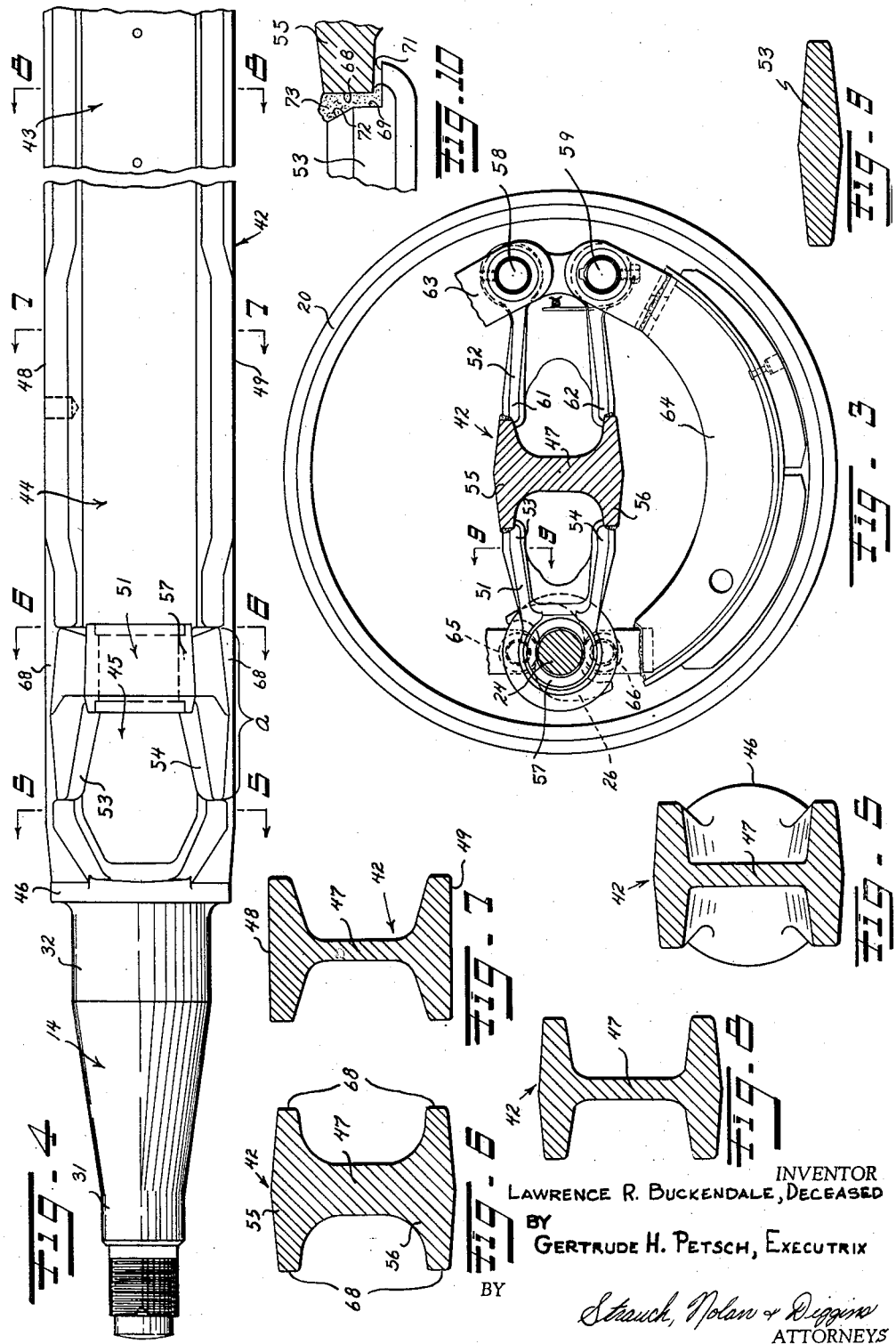
INVENTOR
LAWRENCE R. BUCKENDALE, DECEASED
BY
GERTRUDE H. PETSCH, EXECUTRIX
BY
Strauch, Nolan & Diggins
ATTORNEYS

United States Patent Office 2,831,731
Patented Apr. 22, 1958

2,831,731

NON-DRIVING AXLE

Lawrence R. Buckendale, deceased, late of Detroit, Mich., by Gertrude H. Petsch, executrix, Detroit, Mich., assignor to Rockwell Spring and Axle Company Application September 2, 1953, Serial No. 378,098

10 Claims. (Cl. 301—124)

This invention relates to a non-driving axle for a roadway vehicle and is particularly directed to a special axle construction of improved strength, reduced overall weight and simplified construction. In the specification the invention will be described in its preferred embodiment as a non-driving trailer axle of the I-beam type.

I-beam front axles and trailer axles are widely used in the truck field where ease of fabrication and high resistance to bending are particularly important. In truck and heavy duty trailer axles today, an increasingly dominant consideration in the cost of the final product is the cost per pound of the steel which makes up the axle, so that elimination of excess weight in these axles without sacrifice of strength is increasingly desirable. Furthermore elimination of excess weight in the axle is important in that it reduces the unsprung weight of the vehicle, thereby reducing wear on the tires and the suspensions, and it is common in large truck fleet operation to consider the cost of the unsprung weight of the axles of a vehicle as a factor in determining the cost of operation of the vehicle.

In spite of recognition of the foregoing and the general knowledge that elimination of such weight without sacrifice of strength in these I-beam type axles would be particularly desirable there has been little or no practical solution of the problem, and I-beam axles for trailers have been more or less standardized in shape and structure for many years.

The present invention contemplates solution of the excess weight problems of heavy duty load bearing axles by attacking the problem from a different viewpoint rather than trying to redesign prior axle structures. It provides an axle of entirely new construction and weight distribution wherein at least equivalent and generally better strength is attained using the same amount of metal as prior constructions, and which may be made by up-to-date fabrication methods and involving considerably less manual labor than of prior I-beam type axles.

It is the major object of this invention to provide for a vehicle a non-driving axle assembly of novel design and optimum strength wherein the usual brake mechanism mounting flange is eliminated from the axle beam.

It is a particularly important object of the invention to provide a novel I-beam type non-driving axle for a vehicle which is of such special construction and distribution of metal as to have the maximum resistance to bending and other stress encountered in axle operation for a required amount of metal, and which is less expensive to fabricate than prior I-beam type axles.

It is a further object of the invention to provide an I-beam type non-driving axle of novel construction which is of I-beam cross-section throughout its entire length intermediate the wheel bearing spindles.

A further object of my invention is to provide an I-beam type non-driving axle for a vehicle wherein the usual brake mechanism attachment flange of the prior art is eliminated.

A further object of my invention is to provide an I-beam type vehicle axle wherein the brake shoe pivot and brake shoe operator supports are attached in a novel manner to the I-beam cross-section portion of the axle.

It is a further object of my invention to provide a rigid non-driving axle which is of I-beam cross section substantially entirely between the wheel bearing spindles and wherein oppositely extending brake mechanism supports are rigidly secured as by welding to the sides of the beam at the I-beam cross-section.

A further object of the invention is to provide a rigid non-driving axle wherein separate brake shoe pivot and brake shoe actuator supports are diametrically oppositely disposed and rigidly secured to opposite ends of the upper and lower flanges of I-beam cross-section.

Further objects of the invention will presently appear as the description proceeds in connection with the appended claims and the annexed drawings wherein:

Figure 3 is a section substantially on line 3—3 of Figure 2 and partially broken away illustrating particularly the manner of attaching the brake shoe pivot and brake shoe actuator supports to opposite sides of the I-beam;

Figure 4 is an enlarged side elevation of the one end of the axle of Figure 2 with the brake cam shaft support bracket attached;

Figures 5, 6, 7 and 8 are sections on lines 5—5, 6—6, 7—7 and 8—8 respectively of Figure 4, illustrating the changing shape of the I-beam along the length thereof;

Figure 9 is a section on line 9—9 of Figure 3 showing the shape of each bracket leg; and Figure 10 is an enlarged fragmentary section illustrating the weld joint at each bracket leg.

Figure 1:
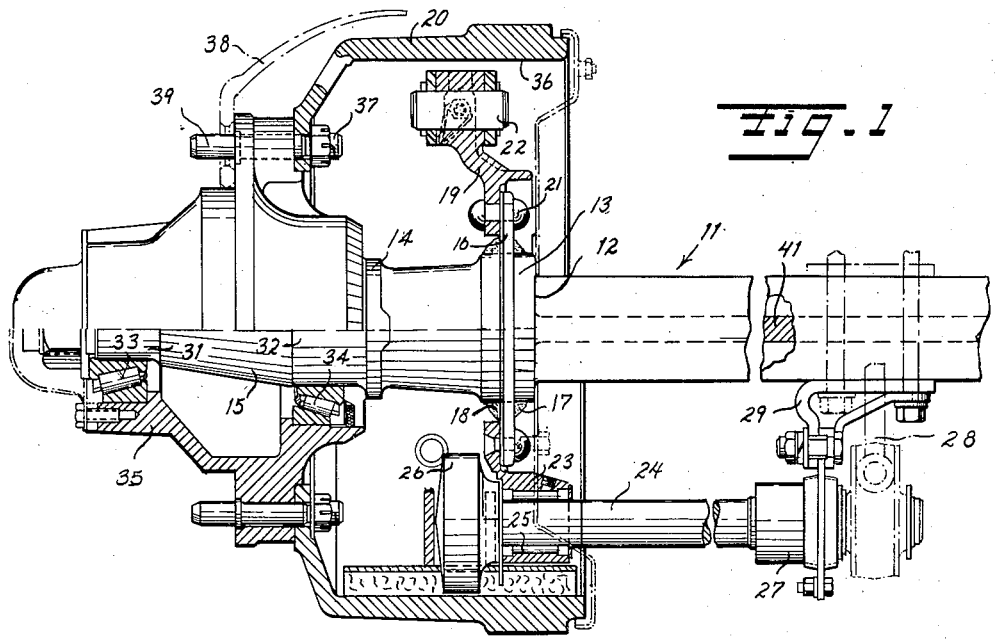
Figure 1 is a top plan view partially in elevation and partially in section of the end of a trailer axle of the I-beam type which is representative of the prior art.

Referring to Figure 1, the prior art axle assembly comprises a trailer axle beam 11 which, at each end outwardly of the end of the I-beam intermediate portion that terminates at the point indicated at 12, is formed with an integral cylindrical section 13, a cylindrical flange 14 and an integral wheel mounting spindle 15, disposed axially outwardly of flange 14. Between the point 12 and the adjacent outer end of the axle beam, this axle beam is of circular cross-section.

The function of the cylindrical section 13 is to provide for mounting of an annular circular plate 16 which is called the brake mechanism mounting flange and which is rigidly secured to the axle beam as by the welds indicated at 17 and 18. The brake mechanism support plate 19 which is an integral unit surrounding the axle beam and substantially closes most of the open end of the brake drum 20 is rigidly secured to flange 16, as by the rivets 21 a series of which are disposed all about the flange. At one side support 19 carries the brake shoe pivots 22, and at the other side it is formed with a hollow boss 23 in which the brake cam shaft 24 is rotatably mounted on bearings 25. Inwardly of the support 19, cam shaft 24 is formed with the brake shoe actuating cam 26, and shaft 24 extends away from boss 23 substantially parallel to the axle beam to a bearing support indicated at 27 and for connection to a lever 28 that is suitably connected to an air motor or the like suitably mounted on the axle beam 11. The bearing support 27 is rigidly secured to the beam 11 as by the bracket 29.

Spindle 15 is provided with spaced cylindrical bearing sections 31 and 32 upon which are secured the inner races of the tapered roller bearings units 33 and 34, respectively, and the outer races of bearings 33 and 34 are rigid with the wheel hub 35. Brake drum 20 having an internal cylindrical surface 36 is secured upon wheel hub 35 as by a series of studs 37 and the ground engaging wheels indicated at 38 are removably secured to the hub on the other side from the brake drum as indicated at 39.

In the construction of Figure 1 the web 41 of the I-beam cross-section portion is straight sided and of substantially constant width and shape from the cylindrical section 13 at one end of the axle beam to the corresponding cylindrical section 13 at the other end of the axle beam. Moreover the attachment of the brake mechanism mounting flange 16 to the cylindrical section 13 and the riveting of support 19 to the flange 16 require special fitting and holding of the parts together for welding and riveting operations requiring considerable manual labor and accuracy in setting up the parts for assembly.

Figure 2:
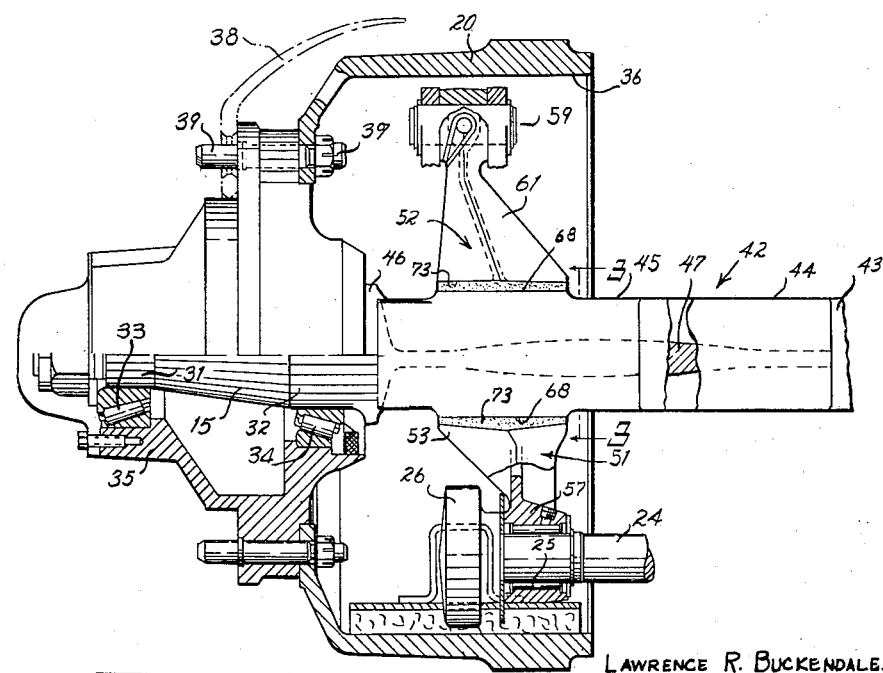
Figure 2 is a top plan view similar to and substantially coextensive with Figure 1 for comparison therewith, showing an I-beam type axle of the preferred embodiment of the invention partially in section and partially in elevation, and particularly illustrating the brake mechanism supports welded to opposite sides of the I-beam.

In Figure 2, the parts that are substantially the same as in Figure 1 are respectively identified by the same numerals.

The axle beam of the invention, the left hand end of which is shown in Figure 2, is designated by the numeral 42 and it is of I-beam cross-section entirely between the wheel bearing spindles and comprises an intermediate section 43 where the vertical web of the I-beam is of about constant width, a spring seat section 44 and a brake mechanism attachment section 45. Thus the I-beam section of this axle, in contrast to the I-beam section of the prior art axle, extends all the way between the cylindrical flanges 46 which correspond to the cylindrical flanges 14 of Figure 1, and there is no brake mechanism mounting flange portion.

Outwardly of each flange 46 the beam is a wheel bearing spindle of the same shape as spindle 15, and is designated by the numeral 15, and the wheel hub and drum assemblies are associated with the spindles as in Figure 1.

Referring to Figure 2 it will be noted that the vertical web 47 of the I-beam gradually thickens starting about the middle of the spring seat section and then tapers back to original thickness as it passes through the brake bracket mounting section (to be described below) until it resumes its original thickness adjacent flange 46. Thus the beam is strongest where the springs and brake brackets are attached, for increased resistance to twisting as well as bending.

Figure 5 shows the I-beam cross section adjacent the flange 46. Figure 6 shows the section 6—6 through the thickest part of the web 47 at about the same place as Figure 3. Figure 7 shows the section 7—7 at the inner end of the spring seat section, illustrating the flat top and bottom surfaces 48 and 49 in this region for attaching the springs. Figure 8 shows the normal I-beam cross-section of the intermediate section 43.

Referring to Figures 2 and 3 the brake mechanism support brackets on the axle beam are illustrated. The wide section of the beam web 47 at the point crossed by line 3—3 in Figure 2 is illustrated in elevation in Figure 3, and the brackets 51 and 52 extend outwardly from opposite sides of the axle beam and are fixed at their inner ends to the opposite sides of the axle beam so as to provide a unitary assembly.

Bracket 51 is the cam shaft support bracket. It is formed at its inner end with spaced substantially parallel legs 53 and 54 which are rigidly attached, preferably by welding, to the upper and lower flanges 55 and 56 respectively of the I-beam so that the bracket 51 projects horizontally from the axle beam. At its outer end bracket 51 is formed with a hollow boss 57 lined with bearings 25 for supporting the camshaft 24, and the center of boss 57 lies in the same horizontal plane as the longitudinal center of the axle beam. As illustrated in Figure 9, the legs 53 and 54 are substantially flat between boss 57 and their ends and taper or increase gradually in width to their ends so as to have a large area of attachment to the I-beam and for reenforcement against lateral bending.

Bracket 52 is the support for the brake shoe pivots 58 and 59 and comprises spaced substantially parallel legs 61 and 62 rigidly attached, as by welding, to the I-beam flanges 55 and 56 at the opposite side from the bracket 51, so that bracket 52 projects horizontally oppositely to bracket 51 in the assembly with pivots 58 and 59 disposed the same distance above and below respectively the horizontal plane containing the longitudinal axis of the axle beam. Legs 61 and 62, as illustrated in Figure 2, also taper from the bracket portion in which the shoe pivots are mounted to a wider portion for reenforcement and optimum area attachment to the I-beam, and they have the approximate cross section of Figure 9.

As shown in Figure 3, the usual brake shoes 63 and 64 are pivoted at adjacent ends at 58 and 59, and rollers 65 and 66 at their other ends engage cam 26, so that clockwise rotation of the cam 26 urges the shoes toward drum 20.

Preferably each bracket leg 53, 54, 61 and 62 is similarly attached to the I-beam in the same manner as illustrated in Figure 10 for leg 53. The side of I-beam upper flange 55 is machined to provide a vertical edge face 68 that extends along the beam for the distance indicated at $a$ in Figure 4, here about four inches. The end of bracket leg 53 is machined to provide a notch having surfaces 69 and 71 at right angles to each other, and surface 69 is cut back at its upper end at 72 to provide a welding scarf. The notched leg bracket thus is located accurately on the I-beam and welded into place, the weld being indicated at 73. The other I-beam flange edges are similarly machined as indicated at 68 in Figure 6, and the other bracket legs are similarly notched and welded to the I-beam. The faces 68 are all parallel to each other and perpendicular to the spring seat surfaces 48 and 49. This results in a permanent rigid assembly with a minimum of fixtures and labor.

In a further embodiment of the invention I contemplate attaching the bracket legs together so that the brackets 51 and 52 could slip over the axle beam and as a unit into final position for welding, and the term bracket means in the claims is intended to cover such construction.

The axle beam assembly of the present invention has proved to be unexpectedly superior to the prior art trailer beams which it has replaced. For example an I-beam trailer axle assembly of the prior art construction of Figure 1 designed to carry 20,000 pounds weighs 250 pounds, while the axle assembly of the invention of the same load bearing rating weighs only 178 pounds, a direct saving of about thirty percent in cost of steel and in unsprung weight. Moreover the welding of the bracket legs to the I-beam can be set up in an automatic submerged arc welding machine to obtain a speedy efficient weld with a minimum of labor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, an axle beam rigid from end to end and comprising wheel bearing spindles at each end, a continuous I-beam section extending substantially entirely between said spindles, said I-beam section having a vertically disposed solid web that is thickened for a region of minor length adjacent each of said spindles and of substantially uniform thickness intermediate said thickened regions, and brake mechanism mounting bracket means welded directly to said I-beam section at said thickened regions.

2. In combination, a rigid axle beam comprising wheel bearing spindles at opposite ends of said beam connected by an I-beam section that extends substantially entirely between said spindles, said I-beam section having a vertical web and top and bottom flanges, brake mechanism supporting bracket means welded to said I-beam flanges just inwardly of each said spindle, and a spring seat region just inwardly of each said bracket means, said web being gradually thickened through said bracket attachment and spring seat regions at each end of the axle beam and being of substantially uniform thickness between the thickened portions.

3. In combination, an axle beam rigid from end to end and provided with wheel bearing spindles at each end connected by an I-beam section having a vertical web and top and bottom flanges, and brake mechanism support bracket means attached to said beam just inwardly of each said spindle, each of said bracket means comprising oppositely projecting bracket members each having spaced legs welded to the top and bottom flanges respectively of said I-beam section.

4. In the combination defined in claim 3, said oppositely projecting bracket members being provided with brake shoe pivots and a cam shaft journal respectively at opposite sides of the axle beam.

5. In the combination defined in claim 3, said web being thickened at the regions said bracket means are attached to said axle beam.

6. In an axle beam for a non-driving vehicle axle, wheel bearing spindles at each end connected by an I-beam section having a vertical web and upper and lower flanges, and a brake mechanism supporting bracket member having spaced legs welded to said upper and lower flanges respectively and projecting from said axle beam just inwardly of each said spindle.

7. In the axle beam defined in claim 6, said bracket member having a brake cam shaft journal boss at its end remote from the axle beam, and each of said legs being tapered and of increasing width between said boss and the corresponding axle beam flange to which it is welded.

8. In the axle beam defined in claim 6, said bracket member having a pair of brake shoe pivots at the end opposite said axle beam, and each said leg being tapered and of increasing width between said pivots and the corresponding axle beam flange to which it is welded.

9. In the axle beam defined in claim 6, each of said legs being notched at its ends and the side of each flange adjacent each said notch being flat for location during assembly and facility in welding.

10. In an axle beam having a wheel bearing spindle at each end connected by an I-beam section having a vertical web and upper and lower flanges, said flanges being flat sided for a minor region just inwardly of each spindle, oppositely projecting brake mechanism support bracket members each having spaced legs welded to said flanges along each said region, and a spring seat region just inwardly of each said flat-sided region having flat top and bottom surfaces perpendicular to the flat sides of said flanges, said web being thicker through said regions at each end of the axle beam than in the intermediate region.

References Cited in the file of this patent

UNITED STATES PATENTS

| | | |
|---|---|---|
| 1,063,485 | White | June 3, 1913 |
| 2,028,394 | Kay | Jan. 21, 1936 |
| 2,132,725 | Davis | Oct. 11, 1938 |
| 2,435,955 | Buckendale et al. | Feb. 17, 1948 |